(12) United States Patent
Middelberg et al.

(10) Patent No.: US 11,716,930 B2
(45) Date of Patent: Aug. 8, 2023

(54) SURROUNDINGS DETECTION DEVICE FOR AGRICULTURAL WORK MACHINES

(71) Applicant: CLAAS Selbstfahrende Erntemaschinen GmbH, Harsewinkel (DE)

(72) Inventors: Rene Middelberg, Osnabrück (DE); Thilo Krause, Glinde (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 17/479,446

(22) Filed: Sep. 20, 2021

(65) Prior Publication Data

US 2022/0000025 A1    Jan. 6, 2022

Related U.S. Application Data

(63) Continuation of application No. 15/342,649, filed on Nov. 3, 2016, now Pat. No. 11,122,740.

(30) Foreign Application Priority Data

Nov. 3, 2015   (DE) .......................... 102015118767.1

(51) Int. Cl.
*A01D 41/127*       (2006.01)
*A01D 57/02*        (2006.01)
(Continued)

(52) U.S. Cl.
CPC ........ *A01D 41/1274* (2013.01); *A01B 69/008* (2013.01); *A01D 34/006* (2013.01);
(Continued)

(58) Field of Classification Search
CPC .............. A01D 41/1274; A01D 34/006; A01D 41/1278; A01D 57/02; A01D 69/03; A01D 34/13
See application file for complete search history.

(56) References Cited

U.S. PATENT DOCUMENTS 3,972,156 A  *  8/1976  Bennett, Jr. .......... A01D 75/187
                                                340/684
4,573,124 A  *  2/1986  Seiferling ............ A01D 41/141
                                              56/DIG. 15
(Continued)

FOREIGN PATENT DOCUMENTS

EP      0887660 A2    12/1998
EP      1332659 A2    8/2003
(Continued)

OTHER PUBLICATIONS

Advisory Action issued in related U.S. Appl. No. 15/342,649, dated Apr. 22, 2020 (2 pages).
(Continued)

*Primary Examiner* — Luis A Martinez Borrero
(74) *Attorney, Agent, or Firm* — Lempia Summerfield Katz LLC

(57) ABSTRACT

An agricultural work machine is provided comprising a surroundings detection device for detecting a surroundings in sections, and one or more controllable working elements, wherein the surroundings detection device generates surroundings detection signals, which can be processed in a control and regulating device assigned to the agricultural work machine, wherein the surroundings detection device is designed as a scanner, which scans the surroundings in scanning planes, and wherein each scanning plane is assigned to the control of working elements.

20 Claims, 6 Drawing Sheets

(51) Int. Cl.
| | | |
|---|---|---|
| *A01D 69/03* | (2006.01) | |
| *A01D 34/13* | (2006.01) | |
| *A01B 69/04* | (2006.01) | |
| *G01S 17/931* | (2020.01) | |
| *A01D 34/00* | (2006.01) | |
| *A01D 34/04* | (2006.01) | |
| *A01D 101/00* | (2006.01) | |

(52) U.S. Cl.
CPC ......... *A01D 41/1278* (2013.01); *A01D 57/02* (2013.01); *A01D 69/03* (2013.01); *G01S 17/931* (2020.01); *A01D 34/04* (2013.01); *A01D 34/13* (2013.01); *A01D 2101/00* (2013.01)

(56) References Cited

U.S. PATENT DOCUMENTS

| | | | | | |
|---|---|---|---|---|---|
| 5,155,984 | A | * | 10/1992 | Sheehan | A01D 41/141 56/DIG. 15 |
| 5,694,751 | A | * | 12/1997 | Behnke | A01B 69/008 56/DIG. 15 |
| 5,809,440 | A | * | 9/1998 | Beck | A01M 7/0089 711/E12.089 |
| 5,961,573 | A | * | 10/1999 | Hale | A01B 79/005 701/470 |
| 6,095,254 | A | * | 8/2000 | Homburg | A01D 41/1278 172/6 |
| 6,389,785 | B1 | * | 5/2002 | Diekhans | A01B 69/008 172/4.5 |
| 6,615,570 | B2 | * | 9/2003 | Beck | A01D 41/141 701/50 |
| 6,661,524 | B2 | * | 12/2003 | Smith | F41H 11/24 356/3.01 |
| 6,791,488 | B2 | * | 9/2004 | Diekhans | A01D 41/141 342/123 |
| 6,826,894 | B2 | * | 12/2004 | Thiemann | A01D 41/141 701/50 |
| 7,155,888 | B2 | * | 1/2007 | Diekhans | A01D 41/1278 56/10.2 R |
| 7,350,343 | B2 | * | 4/2008 | Beck | A01B 69/008 56/10.2 R |
| 7,865,285 | B2 | * | 1/2011 | Price | G05D 1/0274 701/50 |
| 7,992,369 | B2 | * | 8/2011 | Coers | A01D 41/141 56/10.2 E |
| 8,706,341 | B2 | * | 4/2014 | Madsen | A01B 69/001 382/104 |
| 8,755,976 | B2 | * | 6/2014 | Peters | G05D 1/0293 701/1 |
| 8,972,119 | B2 | * | 3/2015 | Morin | E02F 3/845 701/50 |
| 9,220,197 | B2 | * | 12/2015 | Pollklas | A01D 45/00 |
| 9,326,443 | B2 | * | 5/2016 | Zametzer | A01D 41/127 |
| 9,585,309 | B2 | * | 3/2017 | Posselius | A01D 47/00 |
| 9,609,806 | B2 | * | 4/2017 | Schlipf | A01D 41/14 |
| 9,807,933 | B2 | * | 11/2017 | Boyd | A01D 41/127 |
| 11,122,740 | B2 | * | 9/2021 | Middelberg | A01D 69/03 |
| 2002/0189220 | A1 | * | 12/2002 | Beck | G01S 17/931 56/10.8 |
| 2003/0007160 | A1 | * | 1/2003 | Smith | F41H 11/24 356/614 |
| 2003/0145571 | A1 | * | 8/2003 | Diekhans | A01D 43/073 56/10.2 R |
| 2004/0122592 | A1 | * | 6/2004 | Fuessley | A01G 7/06 702/2 |
| 2007/0219720 | A1 | * | 9/2007 | Trepagnier | G01S 17/931 701/300 |
| 2010/0063648 | A1 | * | 3/2010 | Anderson | G05D 1/0088 701/1 |
| 2010/0063673 | A1 | * | 3/2010 | Anderson | G05D 1/0287 701/1 |
| 2010/0274452 | A1 | * | 10/2010 | Ringwald | A01B 69/008 701/50 |
| 2011/0022273 | A1 | * | 1/2011 | Peters | A01B 69/008 701/42 |
| 2011/0213529 | A1 | * | 9/2011 | Krause | E02F 3/431 701/50 |
| 2012/0078471 | A1 | * | 3/2012 | Siefring | B62D 15/0265 701/41 |
| 2012/0083982 | A1 | * | 4/2012 | Bonefas | G05D 1/0223 382/153 |
| 2012/0302299 | A1 | * | 11/2012 | Behnke | A01B 69/008 701/50 |
| 2013/0227922 | A1 | * | 9/2013 | Zametzer | A01D 41/127 56/10.2 R |
| 2014/0100743 | A1 | * | 4/2014 | Foster | A01D 41/1274 701/50 |
| 2014/0118533 | A1 | * | 5/2014 | Chang | E02F 9/261 348/118 |
| 2014/0215983 | A1 | * | 8/2014 | Pollklas | A01D 45/00 56/10.2 R |
| 2014/0324272 | A1 | * | 10/2014 | Madsen | A01B 69/008 701/28 |
| 2015/0025708 | A1 | * | 1/2015 | Anderson | G01S 13/867 340/463 |
| 2015/0025754 | A1 | * | 1/2015 | Krause | G05D 1/0293 701/50 |
| 2015/0148077 | A1 | * | 5/2015 | Jelle | H04W 4/022 455/456.3 |
| 2015/0149048 | A1 | * | 5/2015 | Menke | A01D 43/087 701/50 |
| 2015/0189832 | A1 | * | 7/2015 | Krause | A01D 43/073 414/809 |
| 2015/0305238 | A1 | * | 10/2015 | Klausmann | A01D 75/00 701/50 |
| 2015/0341633 | A1 | * | 11/2015 | Richert | H04N 19/50 375/240.16 |
| 2015/0361642 | A1 | * | 12/2015 | Stratton | G06F 16/29 701/461 |
| 2016/0066506 | A1 | * | 3/2016 | Middelberg | A01D 41/1274 460/6 |
| 2016/0106038 | A1 | * | 4/2016 | Boyd | A01D 34/006 56/10.2 J |
| 2016/0159391 | A1 | * | 6/2016 | Fischer | B62D 3/14 180/422 |
| 2016/0309656 | A1 | * | 10/2016 | Wilken | A01D 41/127 |
| 2017/0088132 | A1 | * | 3/2017 | Sagemueller | H04N 23/11 |
| 2017/0118915 | A1 | * | 5/2017 | Middelberg | A01D 69/03 |
| 2017/0131718 | A1 | * | 5/2017 | Matsumura | G05D 1/02 |
| 2017/0131722 | A1 | * | 5/2017 | Hiramatsu | G05D 1/0238 |
| 2017/0135277 | A1 | * | 5/2017 | Hiramatsu | G05D 1/0242 |
| 2017/0160748 | A1 | * | 6/2017 | Nakagawaa | G05D 1/00 |
| 2017/0251589 | A1 | * | 9/2017 | Tippery | A01B 51/02 |
| 2018/0020611 | A1 | * | 1/2018 | LaRowe | A01G 25/09 701/2 |
| 2018/0084708 | A1 | * | 3/2018 | Neitemeier | A01B 69/001 |
| 2018/0084718 | A1 | * | 3/2018 | Baumgarten | A01D 41/1243 |
| 2018/0084719 | A1 | * | 3/2018 | Neitemeier | G06T 7/269 |
| 2018/0181143 | A1 | * | 6/2018 | Hiramatsu | G05D 1/0295 |
| 2019/0124819 | A1 | * | 5/2019 | Madsen | G05D 1/027 |
| 2019/0128690 | A1 | * | 5/2019 | Madsen | G01C 21/3602 |
| 2019/0129430 | A1 | * | 5/2019 | Madsen | G05D 1/0217 |
| 2019/0129435 | A1 | * | 5/2019 | Madsen | G05D 1/0212 |
| 2019/0239502 | A1 | * | 8/2019 | Palomares | G05D 1/0246 |

FOREIGN PATENT DOCUMENTS

| | | | | |
|---|---|---|---|---|
| EP | 2517543 | * | 10/2012 | ............ A01B 69/00 |
| EP | 2517543 | A2 | 10/2012 | |
| EP | 2873315 | A1 | 5/2015 | |

OTHER PUBLICATIONS

Advisory Action issued in related U.S. Appl. No. 15/342,649, dated Feb. 18, 2020 (3 pages).
Final Office Action issued in related U.S. Appl. No. 15/342,649, dated Jan. 1, 2021 (30 pages).

(56) References Cited

OTHER PUBLICATIONS

Final Office Action issued in related U.S. Appl. No. 15/342,649, dated Jan. 3, 2020 (21 pages).
Final Office Action issued in related U.S. Appl. No. 15/342,649, dated Jan. 11, 2019 (53 pages).
Non-Final Office Action issued in related U.S. Appl. No. 15/342,649, dated Aug. 3, 2020 (30 pages).
Non-Final Office Action issued in related U.S. Appl. No. 15/342,649, dated Jul. 8, 2019 (32 pages).
Non-Final Office Action issued in related U.S. Appl. No. 15/342,649, dated Jun. 27, 2018 (15 pages).

\* cited by examiner

SURROUNDINGS DETECTION DEVICE FOR AGRICULTURAL WORK MACHINES

CROSS REFERENCE TO RELATED APPLICATIONS

This application is a continuation application of U.S. application Ser. No. 15/342,649 (now U.S. Pat. No. 11,122, 740), which claims priority to German Patent Application No. DE 10 2015 118 767.1, filed Nov. 3, 2015, the entirety of both of U.S. application Ser. No. 15/342,649 (now U.S. Pat. No. 11,122,740) and German Patent Application No. DE 10 2015 118 767.1 are hereby incorporated by reference herein.

BACKGROUND

This disclosure describes a surroundings detection device included in an agricultural work machine.

In order to relieve the driver of an agricultural work machine ("vehicle") and increase the efficiency of the agricultural work machine operating on a field, the control of the vehicle, e.g. along a crop edge, and the control of working elements of the vehicle, e.g. the reel height in a combine harvester or the chaff unit performance in a field chopper, is increasingly regulated automatically in today's world based on the surrounding conditions and the expected harvest. For this, agricultural work machines in the prior art are frequently equipped with surroundings detection devices, the surroundings detection signals of which are used for determining the surrounding ground's contour or to determine the surrounding crop density. In particular, surroundings detection devices in the form of laser scanners for enabling an automatic control of agricultural work machines are known in the prior art.

DE19726917 A1 and EP 1269823 A1 describe a system, e.g. having a laser sensor for detecting the ground contour with a single scanning plane and for controlling working elements.

The disadvantage here is that the sensor is limited to the ground contour. It is also disadvantageous that because of the single scanning plane, the controls can only react sluggishly, such that certain imprecisions in the automatic control are to be expected. Furthermore, a compromise must be met regarding the long range, e.g. associated with an early warnings of obstacles, and the close range, e.g. associated with a higher resolution and a smaller blind spot.

EP1266554 B1 describes a device for work boundary detection by means of a laser distance sensor attached to the driver's cab of an agricultural vehicle, wherein the detection range area can be altered in the direction of travel (range of the detection region) and transverse thereto (width of the detection region)—as a function of the surroundings and the vehicle conditions. The high degree of regulatory effort can be regarded as disadvantageous here, by means of which the detection range must be adjusted to the specific circumstances. Furthermore, a continuous scanning and mapping of the field is difficult to carry out due to the changing detection range area. Moreover, when changing the direction, width and range of the detection region, the control and regulating device only has incomplete or imprecise data for controlling working elements. It is likewise disadvantageous that the surrounding detection device is limited to the crop edge detection.

For this reason, it is an object to eliminate the disadvantages described above, associated with the prior art, and in particular, to create a surroundings detection device, which, at least in the close and long range, detects reliably, reduces the number of necessary sensors, and increases the lead times, the responsiveness of the control, and the precision of the automatic control.

BRIEF SUMMARY

This object is achieved in accordance with the agricultural work machine described herein.

In that an agricultural work machine, which comprises one or more controllable working elements and a surroundings detection device for detection of a surroundings in sections, wherein the surroundings detection device generates surroundings detection signals, which can be processed in a control and regulating device assigned to the agricultural work machine, and the surroundings detection device is designed as a scanner, which scans the surroundings in scanning planes, where each scanning plane is assigned to the control of working elements, it is possible to reliably detect in the close and long ranges, reduce the number of necessary sensors and thus the costs, and increase the lead times, the responsiveness of the control, and the precision of the automatic control.

In an advantageous feature of the agricultural work machine, the surroundings detection signals are electromagnetic waves, preferably laser beams. The use of electromagnetic waves, in particular in the form of laser beams, primarily has the advantage that the electromagnetic waves can be easily focused and have a good resolution, and that the surroundings detection signals have a large range, in comparison with acoustic waves. Furthermore, lasers have the advantage of a very narrow frequency range.

In a technically simple manner, surroundings detection signals are transmitted for the scanning, the reflected surroundings detection signals are received, and generate a results signal, in that the surroundings detection device is designed as a scanner. This design has the further advantage of being cost-efficient.

In another advantageous design of the agricultural work machine, the surroundings is formed from a portion of the agriculturally usable area located in the direction of travel and in the range of the surroundings detection signal. Among other things, this has the effect that unnecessary scanning and thus loads to the scanner, reducing its lifetime, are avoided. By concentrating on the data necessary for achieving the objective, the amount of data that must be processed is also kept to a minimum.

In another advantageous feature of the agricultural work machine, the lateral extension of the surroundings detection device extends at least in part beyond the width of the agricultural work machine, wherein the width of the extensions of the agricultural work machine may be contained therein. This ensures that ground features, objects and/or obstacles lying not only in the direct working region of the agricultural work machine, but also in and beyond the lateral boundary area of the agricultural work machine, can be registered by the surroundings detection device, and the risk of damage to the agricultural work machine is reduced. This also results in a reliable detection of ground features, objects and/or obstacles, which border on the work zone of the agricultural work machine, e.g. the crop edge.

In a particularly preferred feature of the agricultural work machine, the surroundings detection device scans the surroundings detected in sections in four scanning planes. As a result, at any arbitrary point in time t, there is a larger data content and a larger data density. By using numerous scanning planes, the pivoting and rotating frequency and the signal frequency can also be reduced, which would mean a longer lifetime of the surroundings detection device.

In another particularly preferred feature of the agricultural work machine, the surroundings detected in sections by the surroundings detection device comprises a close-, mid- and long-range, and zero, one or more scanning planes are assigned to each region. As a result, the scanning planes are at different spacings, and the surroundings detected in sections spread out in the longitudinal direction at a point in time t. Furthermore, this results in different crop penetration depths of the surroundings detection signal, such that only one surroundings detection device is needed.

In another particularly preferred feature of the agricultural work machine, the control and regulating device calculates a distance and/or a distribution density from the time of flight for the reflected surroundings detection signal. With a distance calculation based on the time-of-flight method, a method is used which can be used equally well in the close and long ranges, and delivers precise measurements. The determination of the distribution density enables, for example, the distinction between massive objects and crop harvests, by means of which, among other things, obstacles can be reliably identified.

Because the individually determined distances and distribution densities can be functions of one another, the control and regulating device calculates a ground contour and/or a crop density curve and/or maps the agriculturally usable area from the calculated distances and/or distribution densities. As a result, objects, obstacles and/or ground features, e.g. crop edges, can be reliably identified. In particular, by adding the crop density curve, a digital map, e.g. a crop map, can be created, which can be used for, among other things, targeted fertilization of the crops.

Furthermore, a satellite-supported routing can be partially simulated through the broad and wide coverage of the surroundings by means of numerous scanning planes, as a result of which an expensive GPS guidance system becomes unnecessary. In addition, the simulated satellite-supported guidance can reliably function around tree borders and independently of the satellite signal area coverage.

In another particularly preferred feature of the agricultural work machine, the functional element comprises one or more work organs of an agricultural work machine, preferably a self-driving harvester, preferably a combine harvester, and/or a transport vehicle accompanying the agricultural work machine. The design of the functional element as one or more work organs has the advantage that numerous interacting technical units can be addressed individually or collectively, depending on the requirements. One example thereof is the functional element in the form of a threshing unit, which can be broken down into the work organs and working elements in the form of an accelerating drum, a threshing drum, and a reversing drum.

In accordance with another advantageous feature of the agricultural work machine, it is provided that one, more or all of the scanning planes is assigned to the control of one, more, or all of the working elements. The result thereof is that, on one hand, numerous work processes can be controlled simultaneously, while on the other hand, data from the different scanned distances can be made available selectively. Thus, the scanning planes for the individual working elements can be assigned specifically, depending on the detection of surrounding conditions.

In another particularly preferred feature of the agricultural work machine, there is a short-term precise control and evaluation of the scanning planes in the close-range, and an early rough control of the working elements through evaluation of one or more scanning planes lying in the medium and/or long range. The narrower ground scanning angle in the close range reduces the blind spot, by means of which ground features, objects and/or obstacles can be reliably detected. In addition, the scanning frequency, and thus the resolution, increases in the shorter scanning planes lying closer to the agricultural work machine. As a result, the regulator for the working elements can adapt precisely, in nearly real-time, to the existing conditions in the immediate vicinity, and a higher efficiency can be achieved therewith, in that crop edges, irrigation ditches or swaths can be driven through more precisely. As a result of the long-range scanning, and the longer warning times associated therewith, parameter changes to the working elements can be carried out earlier, successively, and in a manner having a lower materials impact.

In another particularly preferred feature of the agricultural work machine, the surroundings detection device generates a results signal by evaluating a surroundings detection signal of one or more scanning planes, which comprises the position of an obstacle in the surroundings, and which transmits the results signal to the control and regulating device, and the control and regulating device generates steering and/or control signals from this results signal for one or more working elements of the agricultural work machine, in particular the hydraulic steering system, the drive system, the hydraulic brakes system and/or the cutting unit. As a result, the agricultural work machine can automatically adapt numerous working elements to obstacles in the surroundings scanned in sections, e.g. trees or telephone poles, and/or avoid these obstacles, in order to prevent damage to the agricultural work machine caused by the obstacle.

In another particularly preferred feature of the agricultural work machine, the detection of low lying and/or small obstacles is achieved by the surroundings detection device through evaluating the scanning planes lying in the close range, and the detection of higher and/or larger obstacles occurs through evaluating one or more scanning planes lying in the medium and/or long range. Depending on the size of the obstacle, and the distance to the agricultural work machine, a selection is made on the part of the control and regulating device, between initiating an evasive maneuver, an emergency stop and/or a lifting of the cutting unit. In doing so, evasive maneuvers are preferably initiated based on an analysis of the long-range surroundings detection signal, due to the necessary lead time. As a result of its greater crop penetration depth, a lower shadowing due to the smaller blind spot, and the lower crop density, and the higher scanning rate, there is a greater probability of detecting smaller and lower obstacles in the close range, and this close-range detection serves in particular for triggering the emergency stop or raising the crop harvesting attachment, due to the shorter lead time.

In another particularly preferred feature of the agricultural work machine, the surroundings detection device generates a results signal through evaluating a surroundings detection signal from one or more scanning planes, which comprises the crop edge position, the crop height, the course of the crop height, and/or the course of the crop edge in the surroundings, and is sent to the control and regulating device, which generates steering and/or control signals from this results signal for one or more working elements of the agricultural work machine. On one hand, this results in the agricultural work machine being driven precisely along the crop edge, and the reel being able to be set at the optimal height, based on the close-range scan. On the other hand, as a result of the greater width of the scanning planes in the long range, the crop edge is more reliably followed, and in particular, unnecessary directional corrections due to minor irregularities in the course of the crop edge can be avoided.

In a technically simple manner, the guidance along the crop edge and the adaptation to the crop height can be achieved when the working elements include the hydraulic steering system and/or the reel. As a result, both the lateral spacing of the cutting unit to the crop edge, as well as the vertical spacing of the reel to the crop, can be regulated.

In another particularly preferred feature of the agricultural work machine, the surroundings detection device generates a results signal by evaluating a surroundings detection signal from one or more scanning planes, which comprises the end of the field in the surroundings, and which is transmitted to the control and regulating device, which generates steering and/or control signals from this results signal for one or more working elements of the agricultural work machine, which include the hydraulic control system, the hydraulic brake system, the drive system, and/or the cutting unit. As a result, the cutting unit is automatically raised into a safety position at the end of the field, and the vehicle is steered out of the track and can be guided into the next track.

BRIEF DESCRIPTION OF THE DRAWINGS

Further advantageous designs are the subject matter of further dependent claims, and shall be described below, based on exemplary embodiments depicted in numerous figures. Therein:

DETAILED DESCRIPTION

The agricultural work machine depicted in FIGS. 1 to 4 is a self-driving combine harvester. It is within the scope of the agricultural work machine to also be in the form of another self-driving harvesting machine, including a field chopper, or a system transporter, e.g. a tractor.

Figure 1:
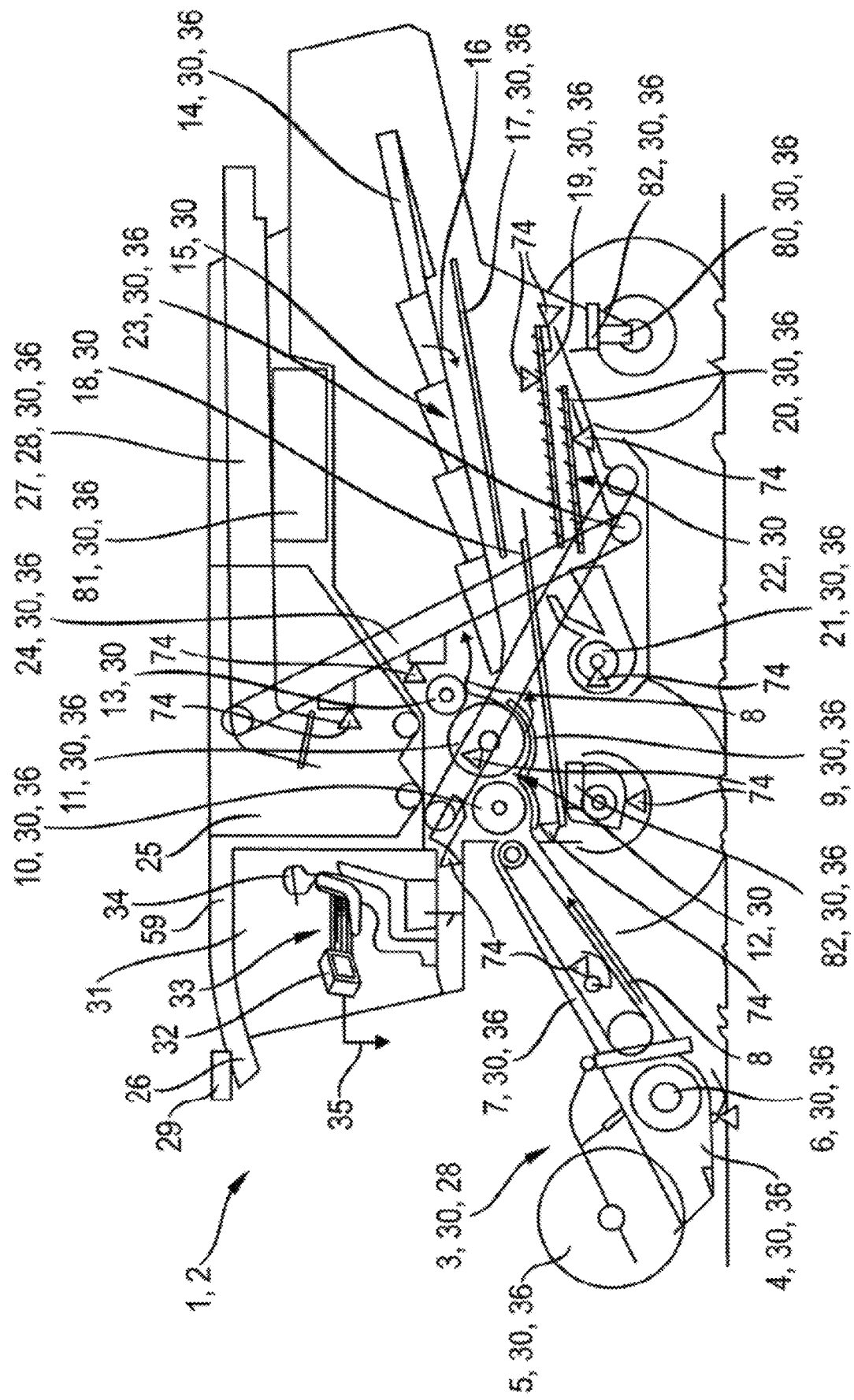
FIG. 1 shows a schematic view of an agricultural work machine designed as a combine harvester, comprising a surroundings detection device.

The agricultural work machine 1 schematically depicted in FIG. 1 as a combine harvester, has a cutting unit 3 in its front region, composed of cutter bars 4, the reel 5, and the header auger 6. The cutting unit 3 is connected to the inclined conveyor 7 of the combine harvester 2 in the manner known per se. The plants are cut by the cutter bars 4, and the harvest is fed to the header auger 6 by means of the reel 5. The harvest flow 8 supplied to the inclined conveyor 7 is supplied, in the upper, rear region of the inclined conveyor 7, to the lower accelerating drum 10, at least partially encased by a threshing concave 9, and subsequently to the threshing drum 11, at least partially encased by a threshing concave 9, of the threshing unit 12 of the combine harvester 2. A deflecting drum 13 disposed downstream of the threshing drum 11 in the threshing unit 12 deflects the harvest flow 8 exiting the threshing unit 12 at the rear thereof, such that it is supplied directly to a separating unit 15 designed as a straw walker 14. The harvest flow 8 is conveyed on the rotating straw walker 14 such that freely moving grains 16 contained in the harvest flow 8 are separated out in the lower region of the straw walker 14. The grains 16 separated out in the threshing concave 9 as well as in the straw walker 14 are fed over the return substrate 17 and preparation substrate 18 to cleaning unit 22 composed of numerous sieve planes 19, 20 and a fan 21. The cleaned grain flow is then supplied to a grain tank 25 via a grain auger 23 and an elevator 24. The grain tank 25 can be emptied via a grain tank unloading tube 27. Both the grain tank unloading tube 27 as well as the cutting unit 3 represent an extension 28 thereby, which extends beyond the dimensions of the rest of the agricultural work machine 1.

There is a surroundings detection device 29 located on the edge 26 of the roof of the cab, in the form of a scanner 72 here, more precisely a laser scanner 40. The work organs 36, including the cutter bars 4, the reel 5, the accelerating drum 10, or suchlike, and their groupings, including the cutting unit 3, the threshing unit 12, the separating unit 15, the cleaning unit 22, or suchlike, shall be referred to below as working elements 30 of the agricultural work machine 1. The working elements 30 comprise the electronic and mechanical components of a work organ 36 and/or the groupings of work organs to form working elements 30. Thus, the working elements 30 can be listed hierarchically, i.e. in groups and the sub-units thereof. By way of example, in the case of a combine harvester, as follows:

vehicle control unit: hydraulic steering system 80, hydraulic brake system, drive system 81, variator cutting unit: reel 5, cutter bars 4 threshing unit 12: accelerating drum 10, threshing drum 11, threshing concave 9, deflecting drum 13 separating unit 15: straw walker system, rotating separating system, return substrate 17 cleaning unit 22: sieve planes 19, 20; fan 21

The listing of the groups and sub-units of the working elements 30 is not exhaustive, but rather, is only given by way of example. The same applies for other embodiments of the agricultural work machines 1.

Furthermore, the agricultural work machine 1 has a driver's cab 31, in which at least one control and regulating device 33, provided with a display unit 32, is disposed, by means of which numerous working elements 30 can be controlled in a manner to be described in greater detail below, either automatically or initiated by an operator 34 of the agricultural work machine. The control and regulating device 33 communicates with the surroundings detection device 29 and numerous sensor systems 74 in the working elements 30 via a so-called bus system 35, in a manner known per se. Details regarding the structure of a majority of the sensor systems 74 in the working elements 30 are described in detail in DE 101 47 733, the contents of which are hereby a component of the disclosure of this patent application, in their entirety, such that the structure of the sensor systems 74 in the working elements 30 shall not be described again below.

Figure 2:
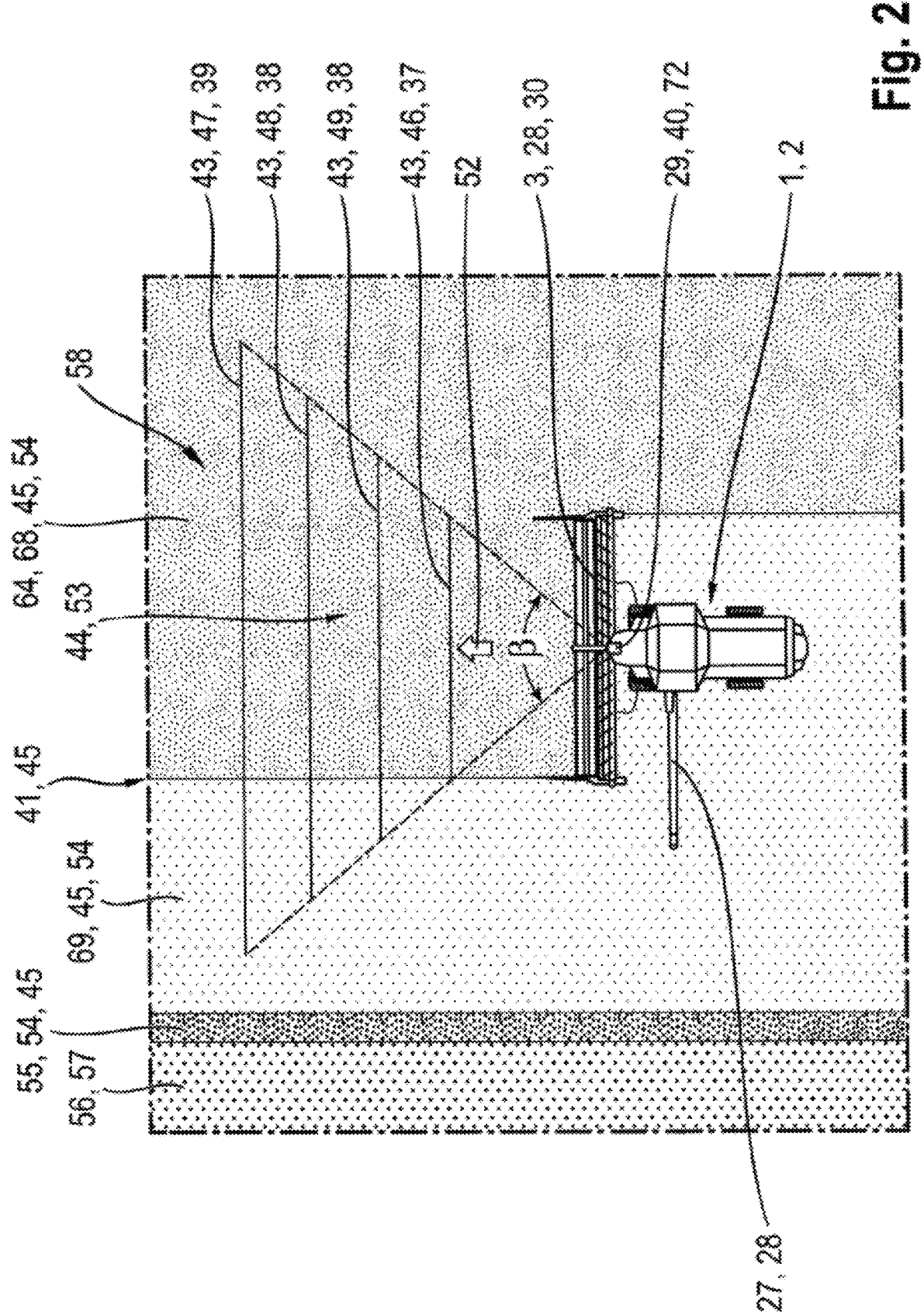
FIG. 2 shows a schematic depiction of the scanning planes according to the agricultural work machine, in a surroundings detected in sections (seen from above)

An agricultural work machine 1 designed as a combine harvester 2, having a surrounding detection device 29 designed as a laser scanner 40, is depicted in FIG. 2 from a bird's eye view. In this exemplary embodiment, the laser scanner 40 is attached at the middle to the front edge 26 of the roof of the driver's cab of the agricultural work machine 1, which is steered in the manner according to the agricultural work machine 1, by means of numerous scanning planes 43, four scanning planes 46, 47, 48, 49 here, along a crop edge 41. In addition, the surroundings 44 detected in sections by the laser scanner 40 is depicted, which contains four scanning planes 46-49 in this exemplary embodiment. The surroundings detection signals 42 are formed by electromagnetic waves, formed by laser beams 73 in the depicted exemplary embodiment, which are reflected by a ground feature 45, obstacle 65 or object 51. Among other things, lidars, laser scanners 40, or radars can thus be used as surroundings detection devices 29. The surroundings detection device 29 in one embodiment may sense a surrounding environment and comprise an environment detection device, and in a second embodiment may sense surrounding landscape and comprise a landscape detection device. Features described for the surroundings detection device 29 may be applicable to all embodiments of the surroundings detection device 29 described herein.

The measured physical properties of the surroundings detection signal 42 can also comprise the amplitudes, the frequencies, and the phases, in addition to the time of flight. With time-of-flight methods, the surroundings detection device 29 emits light pulses, and measures the time the light needs to return from a ground feature 45, an obstacle 65 or an object 51. It is then possible to calculate the associated distance from the time needed. The distribution density represents a derived variable, based on the size of the gaps between the plants. This gap volume results in distance measurements that fluctuate differently according to a specific pattern. While massive objects 51, massive obstacles 65 and massive ground features 45 have a distribution density of one or nearly one, a plant crop has a distribution density between zero and significantly less than one. In order to calculate the distance, a known time-of-flight calculation method, known per se, and therefore not described in greater detail, may be used. In addition, it is conceivable that a phase or frequency time-of-flight method is used, and with shorter distances, a triangulation method may be used. In accordance with the agricultural work machine 1, the surroundings detection device 29 can have one or more emitting and detecting units. The scanning of the individual scanning planes 43 occurs via known mechanisms for aligning surroundings detection signals 42. In an advantageous feature, rotatable mirrors are used to pivot the surroundings detection signal 42. In another advantageous feature, the surroundings detection device 29 is pivoted. The scanning can be made continuously, or discretely, in the form of single-point measurements. In accordance with an advantageous feature, the scanning planes 43 are quasi-continuously scanned with quick successions of single-point measurements. The surroundings 44 detected in sections represents, according to the agricultural work machine 1, an expanding, three-sided sub-area 53 of the agriculturally usable area 54 located in the direction of travel, spanning a scanner aperture angle (β), starting from the agricultural work machine 1. The agriculturally usable area 54 likewise contains the borders 55 to bordering areas 56, and can thus also comprise a bordering trench, a tree line, or other bordering ground features 45, obstacles 65 and/or objects 51. The term ground feature 54 comprises all detectable features in the surroundings, which protrude from a substantially flat ground surface 57, and are naturally connected thereto, or are formed from the ground surface. This includes plants, trenches, mounds, ruts, stubble fields, the crop edges 41 and the crop heights 90. The term object 51 comprises all of the other detectable features in the surroundings 58 that protrude from a substantially flat ground surface 57. This includes rocks, animals, people, telephone poles and power masts, other vehicles, swaths, and harvested crops. The surroundings 44 detected in sections by the surroundings detection device 29 can be divided into a close 37, medium 38, and long range 39, wherein zero, one or more scanning planes 43 can be assigned to each range 37, 38, 39 according to the agricultural work machine 1. The close range 37 comprises scanning plane 46 which are closest to the cutting unit 3. The long range 39 comprises the scanning plane 47, which is furthest from the cutting unit 3. The medium range 38, which can be further subdivided, if needed, depending on the number of scanning planes, comprises the scanning planes 48, 49, lying between the close 37 and long range 39. A scanning plane 43 can represent multiple single-point scans on an imaginary line between the sides of the triangular sub-area 53 of the surroundings 44 detected in sections thereby. The scanning plane is to be understood thereby as a geometric plane. If the individual beams of the multiple single-point scans in a scanning plane reach a planar, unslanted, ground surface without any obstacles in the beam path, then the course of a scanning plane is obtained. The course of a scanning plane 43 can be orthogonal to the direction of travel 52, or lie in the transition region to a parallel orientation to the direction of travel 52. The scanning planes can have a parallel spaced-apart course, as well as an intersecting course. At least two scanning planes 43 are scanned. In accordance with an advantageous design, four parallel, spaced-apart scanning planes 43, orthogonal to the direction of travel 52, are scanned.

The results signals generated by the surroundings detection unit comprise the data regarding the distances, distribution densities, crop edge position, crop height, crop height course and/or crop edge course, crop density, crop density course, crop penetration depth and/or suchlike, which are processed subsequently by the control and regulating device 33, and then correlated to one another.

In accordance with the agricultural work machine 1, it is now proposed that zero, one or more working elements are assigned to each scanning plane 43. In that now each functional element 30 comprises one or more work organs 36 of the agricultural work machine 1, work sequences can be automated.

Furthermore, in accordance with the agricultural work machine 1, a method is provided, in which the control and regulating device 33 guides the agricultural work machine 1 along the crop edge 41 of the harvest 64, based on the results signals or the scanning planes 43, wherein the control and regulating device 33 can access at least two, preferably all of the scanning planes 43, in order to control the functional element 30 in question in a timely and precise manner. In doing so, the agricultural work machine 1 is automatically braked, accelerated, and/or steered, via control signals 89 sent via known means to the hydraulic steering system 80, hydraulic brake system 82 and the drive system 81 of the working elements 30. The crop edge represents the transition between grain plants 68 and the stubble field 69, or the boundary of the agriculturally usable area 54.

Furthermore, in accordance with the agricultural work machine 1, a method is provided, in which the control and regulating device 33 orients the reel 5 of the agricultural work machine 1 to the crop height 90 of the harvest 64, i.e. the upper edges of the grain plants 68, based on the results signals 50 of the scanning planes 43, wherein the reel 5, a functional element, is automatically adjusted by known means in terms of height, by means of control signals 89 of the control and regulating device 33. The control and regulating device can access at least two, preferably all, of the scanning planes 43 thereby, in order to control the functional element 30 in question in a timely and precise manner.

In another preferred method, a satellite-supported guidance system is partially simulated by using numerous, or all of the scanning planes 43. In this manner it is possible, in an exemplary embodiment, to generate four respective virtual pathways in front of the agricultural work machine 1 from all of the four scanning planes 43, in a digital map, at any point in time t, by tracing a swath path, an irrigation ditch, or other driving path features, which are then followed by the agricultural work machine 1. Driving path features are to be understood here to mean ground features 45, which may serve as orientation points for guiding the agricultural work machine 1. Thus, driving path features comprise, among other things, furrows or mounds, preferably irrigation ditches and swaths.

Figure 3:
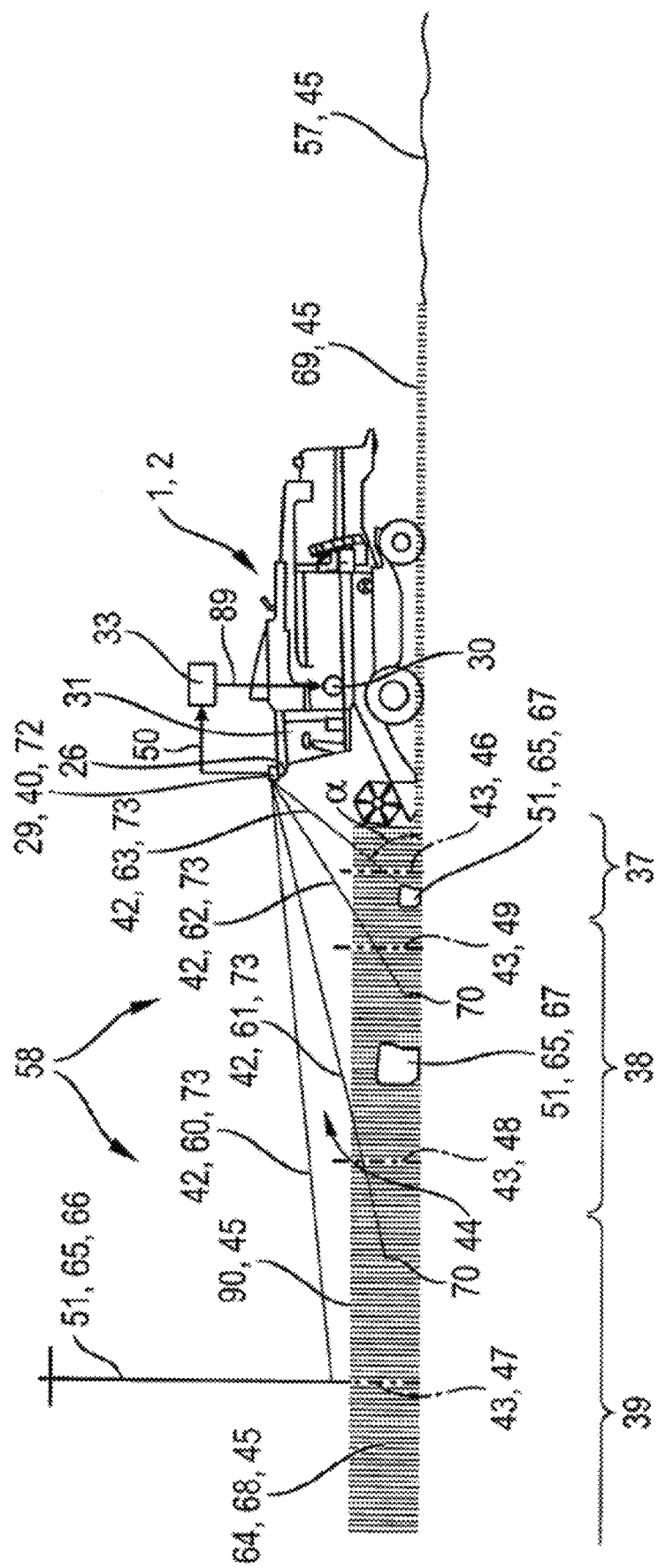
FIG. 3 shows a schematic depiction of the scanning planes according to the agricultural work machine, in a surroundings detected in sections, (side view)—detection of obstacles.

The agricultural work machine 1 is depicted in a side view in FIG. 3, in the form of a combine harvester 2 having a laser scanner 40 on the roof edge 26 of the cab, which scans the front region with four diverging laser beams 60-63, in four space-apart planes 46, 47, 48, 49. The course of the beam for the surroundings detection signals 42 is made visible thereby. Various ground features 45 and obstacles 65 are depicted, which the spaced-apart scanning planes 43 pass through, or have passed through. The scanning planes 43 are schematically depicted here as a broken line comprising dashes and dots. Furthermore, the ground scanning angle α is depicted in an exemplary manner for the scanning planes 63. The surroundings detection device 29 can be installed on or in the agricultural work machine 1. It is oriented in the direction of travel 52, and at a slant toward the ground. The surroundings detection device 29 is preferably located centrally between the left and right-hand sides of the agricultural work machine 1, at an elevated point, preferably outside, on the cab roof 59, or in the vehicle cab 31, preferably on the front edge 26 of the roof of the cab. The elevated position results in an adjustable, steeper ground scanning angle α between the surroundings detection signals 42 and the ground surface 57, the object 51, the obstacle 65, and/or the ground feature 45.

The different ground scanning angles α of the four laser beams 60-63 determine the detection of ground features 45, obstacles 65 and/or objects 51 of different heights. The laser beam 63 with the greatest ground scanning angle α, corresponding to the scanning plane 43 in the close range, penetrates most deeply into the harvest crop 64, and also detects ground features 45, obstacles 65 and/or objects 51 far beneath the crop height 90. Laser beams 60, 61 having smaller ground scanning angles α and high beam ranges are used for the detection of ground features 45, obstacles 65 and/or objects 51 extending above the crop height 90, i.e. scanning planes 43 from the long range 39 and/or medium range 38. Thus, surroundings data from different distance ranges 37, 38, 39 and/or crop penetration depths 70 of the laser beams 72 are available at any point in time t.

In accordance with the agricultural work machine 1, a method is provided, in which the control and regulating device 33 effects a short-term, precise control by means of the results signals 50 of the close-range scanning plane 46, and effects a timely, rough preliminary control of the working elements 30 by means of the results signals 50 from the long-range scanning plane 47. This occurs by means of steering and/or control signals 89 from the control and regulating device 33 to the working elements 30. By way of example, the reel 5 can already be moved into the appropriate boundary region of the optimal height, prior to reaching a break in the crop height 90, by means of which the necessary height adjustment is smaller when reaching the crop height break.

Furthermore, a method is provided in accordance with the agricultural work machine 1, in which the control and regulating device 33 prevents a collision with obstacles 65 by means of results signals 50 of the scanning planes 43, wherein the agricultural work machine 1 is automatically braked, redirected, and/or the cutting unit 3 is moved, through the transmission of control signals 89 to the working elements 30 via known means. The control and regulating device 33 can access at least two, preferably all of the scanning planes 43 thereby.

Rigid and movable ground features 45 and objects 51 are to be understood here as obstacles 65, which could damage the agricultural work machine 1, or lead to a contamination of the harvested crop. This includes trees, tree trunks, boulders, rocks, buildings, protruding sewer lines, animals, or suchlike.

In a particularly preferred design of the agricultural work machine 1, the results signals 50 of the long-range 39 scanning plane 47 are evaluated by the control and regulating device 33 for detecting large obstacles 66, which still allows for avoiding the large obstacle 66, depending on the speed of the agricultural work machine 1. The control and regulating device 33 also controls the hydraulic steering system 80, hydraulic brake system 82, and the drive system 81 of the working elements 30, by means of steering and/or control signals 89, and steers the agricultural work machine 1 around the large obstacle 66 in a timely manner. In general, voluminous and/or high obstacles 65 are to be understood here as large obstacles 66, e.g. houses, telegraph and telephone poles, or trees, which preferably extend above the crop height.

For small obstacles 67, the results signals 50 of the close-range scanning planes 46 are preferably evaluated by the control and regulating device 33, the steering and/or control signals of which lead to either a raising of the cutting unit 3 of the of the working elements 30, or to an immediate stopping of the agricultural work machine 1 by the hydraulic brake system 82 and the drive system 81 of the working elements 30, depending on the height of the obstacle. Among other things, small obstacles are understood here to be rocks, animals, fallen tree trunks, or protruding sewer covers, which lie below the crop height 90, or have not been detected by previous scans.

The results signals 50 of the scanning planes 48, 49 in the mid-range 38 can be referenced by the regulating and control device 33 for both scenarios, if needed.

Furthermore, a method is provided in accordance with the agricultural work machine 1, in which the control and regulating device 33 can identify a track for vehicle guidance by means of the results signals 50 of the scanning planes 43, and can automatically guide the agricultural work machine 1 into/along this track by means of forwarding steering and/or control signals 89 to the working elements 30. The control and regulating device 33 can access data from at least two, preferably all of the scanning planes 43 thereby, in order to guide the agricultural work machine 1 into/along the track in a timely and precise manner, through regulating the hydraulic steering system 80, the drive system 81 and/or the brake system 82. Any driving path features may be used to identify the track. Driving path features are understood here to be ground features 45, which can serve as orientation points for guiding the agricultural work machine 1. As such, driving path features comprise, among other things, furrows or mounds, preferably irrigation ditches and swaths.

Furthermore, a method is provided in accordance with the agricultural work machine 1, in which the control and regulating device 33 can calculate the crop height through results signals 50 of the scanning planes 43, and automatically adjust the cutting unit 3 of the working elements 30 by means of steering and/or control signals 89. The control and regulating device 33 can access data from all scanning planes 43 thereby, but preferably the close-range scanning planes 43, in order to adjust the positions of the reel 5 and the cutter bars 4 to the crop height in a timely and/or precise manner, by controlling the lifting hydraulics.

Furthermore, a method is provided in accordance with the agricultural work machine 1, in which the control and regulating device 33 can calculate the expected harvest yield from the results signals 50 of the scanning planes 43, and automatically adjust working elements 30 to the expected harvest yield by means of steering and/or control signals 89. The control and regulating device 33 can access data from numerous, preferably the close-range, scanning planes 43, in order to automatically adjust the agricultural work machine 1 in a timely and precise manner, through regulating the performance of the drive system 81, the inclined conveyor 7, the threshing or chaff unit 12, the separating unit 14 and/or the cleaning unit 22 of the working elements 30. The control of the inclined conveyor drive, the threshing drum drive and the straw walker drive are specified here by way of example.

Figure 4:
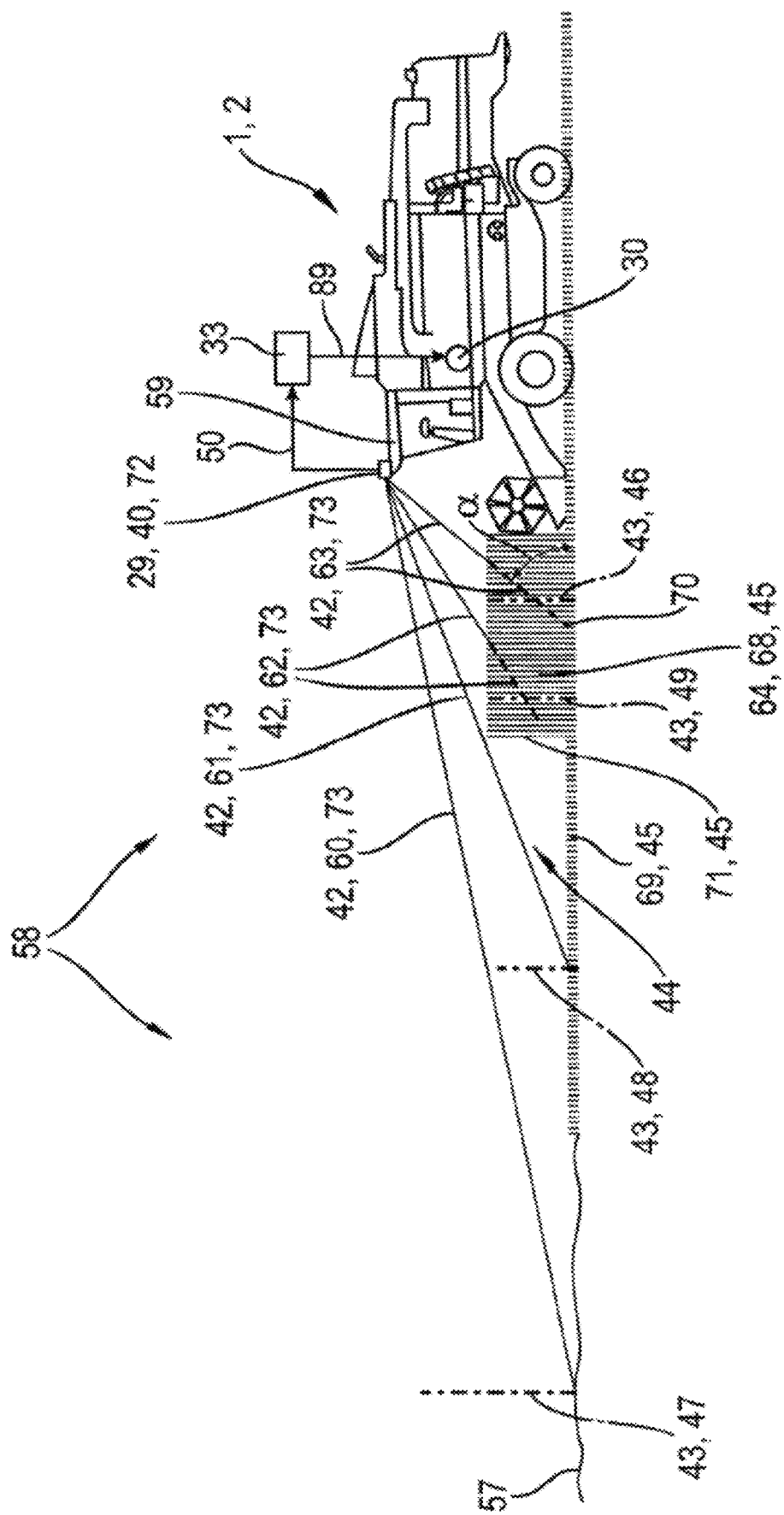
FIG. 4 shows a schematic depiction of the scanning planes according to the agricultural work machine in a surroundings detected in sections (side view)—detection of the end of the field.

An agricultural machine 1 in the form of a combine harvester 2 having a laser scanner 40 on the roof 59 of the cab, is shown in a side view in FIG. 4, and in a manner analogous to that in FIG. 3. Deviating therefrom, however, the detection of the end of the field is depicted here. The end 71 of the field passes through a portion of the spaced-apart scanning planes 43 thereby. The scanning planes 43 are schematically depicted here as lines comprising dashes and dots. In a method according to the agricultural work machine 1, it is provided that the control and regulating device 33 can automatically identify the end of the field 71 by means of the results signals 50 of the scanning planes 43, and the agricultural work machine 1 can be automatically steered, via steering and/or control signals 89 to the working elements 30, out of the track, and if applicable, into the next track, and/or the cutting unit 3 can be deflected. The control and regulating device 33 can access data thereby, from at least two, the scanning planes 47 and 48 in this example, preferably all of the scanning planes 43, in order to steer the agricultural work machine 1 out of and into a track in a timely and precise manner, by means of controlling the hydraulic steering system 80, the drive system 81, and the hydraulic brake system 82 of the working elements 30. In addition, the cutting unit 3 is automatically raised to an elevated safety position at the end of the field 71, via a lifting hydraulics, and is again lowered into the working position at the start of the next track. The field end 71 is understood thereby to be a transition in the direction of travel from the harvest crop 64 to a stubble field 69, the edge of the field, the end of the swath, or other ground feature or object changes, which require a change in direction not due to an obstacle, in order to continue the harvest. The track can depict an irrigation ditch, a swath path, a crop edge guidance track, or suchlike.

Figure 5:
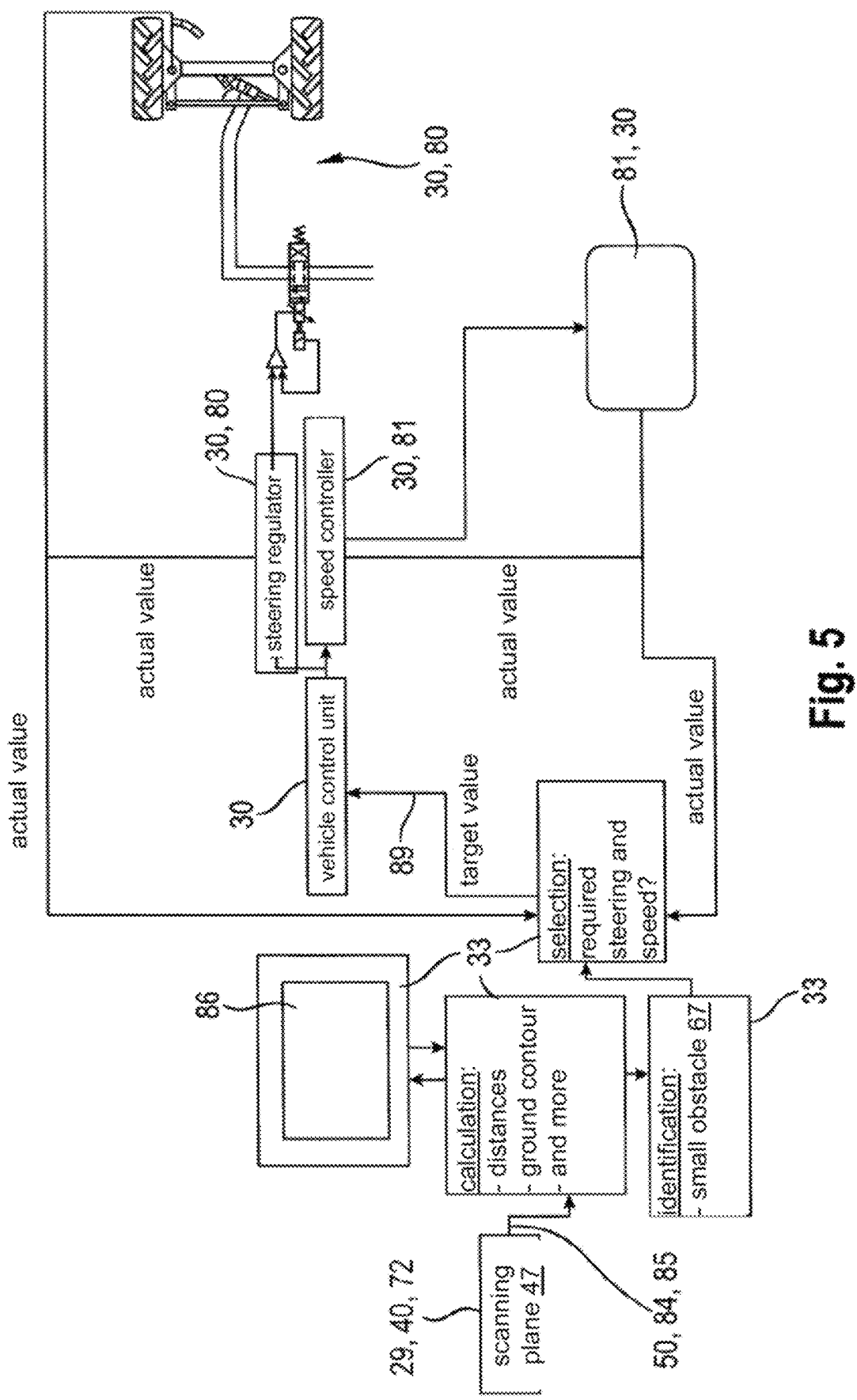
FIG. 5 shows a regulating and control diagram for the example of a large obstacle.
Figure 6:
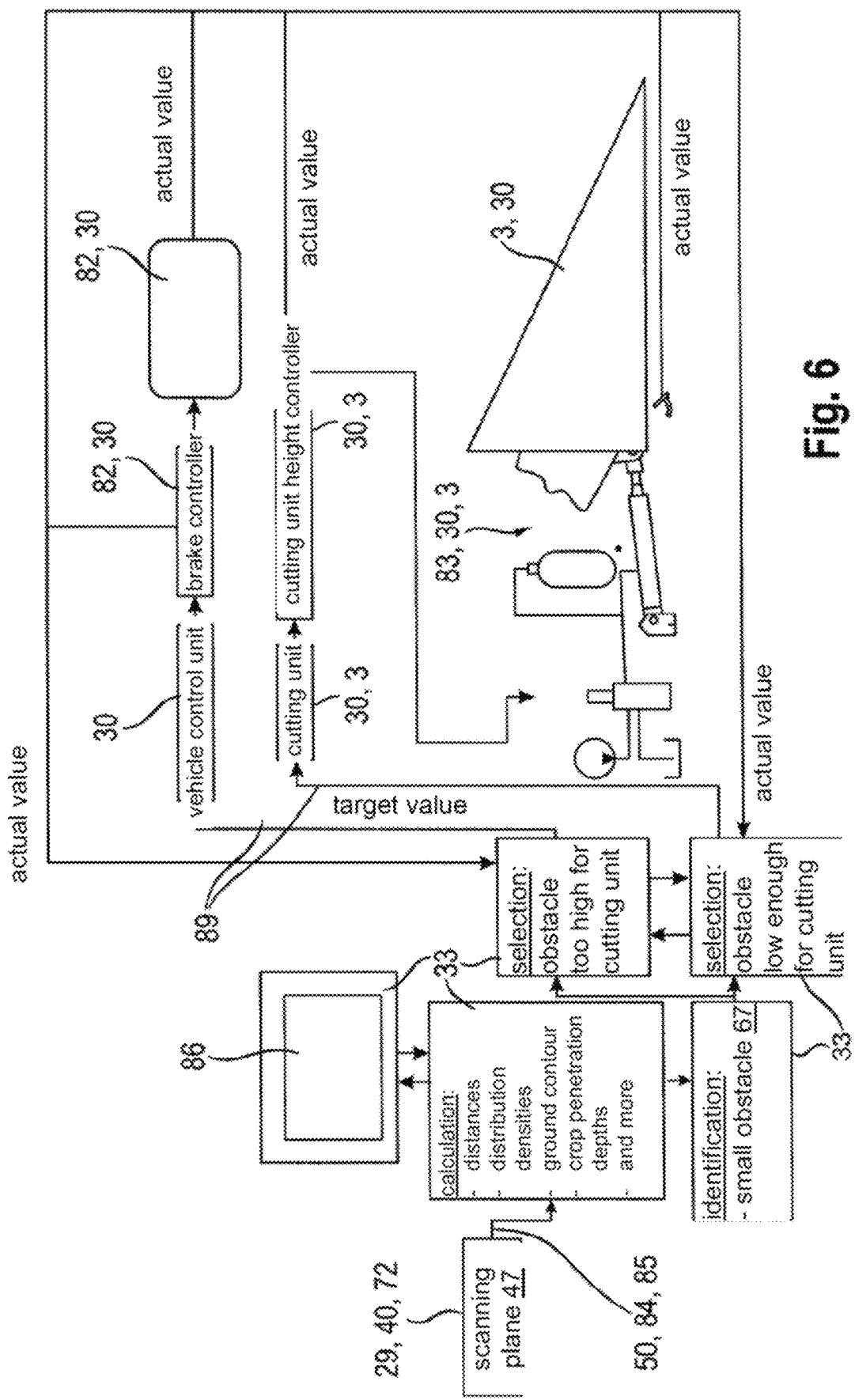
FIG. 6 shows a regulating and control diagram for the example of a small obstacle.

The control and regulation of the working elements 30, as well as a possible allocation of the scanning planes 43 to the working elements 30 is shown in detail, by way of example, for the case of obstacle recognition, in the exemplary embodiments depicted in FIG. 5 and FIG. 6. It is within the scope of the agricultural work machine 1 that a regulation adapted to other purposes exists, with respect to circumstances such as a driving path guidance, a crop edge guidance, swath steering, automatic detection of the field ends, the tracking of objects.

The means for automatic control of a combine harvester 2 in the event of a large obstacle 66, e.g. trees or telephone poles extending above the crop height, through regulating working elements 30 by means of the results signals 50 of the scanning planes 43 in the long range 39 are shown in FIG. 5 by way of example. The surroundings detection device 29 transmits results signals 50, which contain distance data 84 and/or the distribution data 85 from the surroundings detection signals 42 of the scanning planes 43, to a control and regulating device 33 assigned to the agricultural work machine 1. In the depicted example, the results signals 50 from the scanning planes 47 in the long range 39 are transmitted to control and regulating device 33. The control and regulating device 33 calculates the distances, the distribution densities, the ground contour 87 and the crop density curve 88 from the results signals 50 of the surroundings detection device 29, and identifies the ground features 45, obstacles 65 and objects 51 by means of an algorithm After identifying a large obstacle 66, and the determination of its width by the control and regulating device 33, and calculating in the actual value of the vehicle speed, the steering angle, and the proximity to the object by means of an implemented regulating algorithm, the necessary steering angle and the necessary speed are calculated, a steering maneuver is determined, and steering and/or control signals 89 are sent to the hydraulic steering system 80 and the drive system 81 of the working elements 20, more precisely, to the steering controller, and the speed regulator, which activate the mechanical components of the working elements 30 in accordance with an implemented regulating algorithm. The speed regulator of the hydraulic drive of the drive system 81 reduces the pump performance of the hydraulic pumps, by means of which the hydraulic motors function at a lower speed. Consequently, the agricultural work machine 1 is slowed. The steering controller in the hydraulic steering system 80 opens the valves in the control pump, by means of which the quantity of hydraulic fluid supplied to the steering cylinder is increased, and the steering angle is altered. Consequently, the agricultural work machine 1 executes a previously determined steering maneuver. The determined steering maneuver is continuously adjusted thereby, on the basis of the results signals 50 of the surrounding detection device 29 and its scanning planes 43. After driving around the large obstacle 66, the previous driving path and the harvesting process are automatically resumed.

By storing and/or superimposing the distance data 84 and/or the distribution density data 85, the control and regulating device 33 can calculate the ground contour 87 and/or the crop density curve 88, and create digital maps 86 of the agriculturally usable area 54.

The control and regulating device 33 can be designed in the form of a computer, and contain the following elements: a computer or another evaluation unit, input units (e.g. a touchscreen, buttons, switches and/or knobs), displays 32, data communication networks (e.g. a CAN-BUS), programs, control and regulating modules (e.g. connected directly to the working elements 30).

The means for automatic control of a combine harvester 2 in the event of a small obstacle 67, e.g. protruding sewer covers or a rock, through regulating working elements 30 by means of the results signals 50 of the scanning plane 43 in the close range 37, are depicted by way of example in FIG. 6. The control and regulating device 33 receives the results signals 50 of the closes scanning plane 46, calculates the distances, distribution densities, ground contour 87 and crop density curve 88, and identifies the object 51 as a close and small obstacle 67 using an algorithm. On the basis of an implemented regulating algorithm, which takes into account the vehicle speed, the height of the obstacle, the height of the cutting unit and/or the proximity to the object, and on the basis of the actual values for the height of the cutting unit, and the vehicle speed, the control and regulating device 33 makes a selection between an emergency stop or a raising of the cutting unit, and sends the target values by means of steering and/or control signals 89 to the hydraulic brake system 82 and/or cutting unit 3 of the functional units 30. Thus, the selection of the emergency stop leads in particular to the activation of the regulator for the hydraulic brake system 82, which opens the operating brake valve, and increases the pressure on the brake piston. The vehicle is braked. The selection of the raising of the cutting unit leads, in particular, to the activation of the regulator for the cutting unit lifting hydraulics 83 of the functional units 30, which opens a hydraulic valve, and fills the hydraulic cylinder with hydraulic fluid. Consequently, the cutting unit 3 is raised to a safety height, out of reach of the small obstacle.

The depictions in the exemplary embodiments are not exhaustive, but rather, merely exemplary. The same applies to agricultural work machines having other drives, steering systems, and adjustment mechanisms of the working elements. In particular, an action, e.g. avoiding a large obstacle, can be carried out by other or additional working elements than those specified in the exemplary embodiments.

| List of Reference Symbols: | |
|---|---|
| 1 | agricultural work machine |
| 2 | combine harvester |
| 3 | cutting unit |
| 4 | cutter bars |
| 5 | reel |
| 6 | header auger |
| 7 | inclined conveyor |
| 8 | harvest flow |
| 9 | threshing concave |
| 10 | accelerating drum |
| 11 | threshing drum |
| 12 | threshing unit |
| 13 | deflection drum |
| 14 | straw walker |
| 15 | separating unit |
| 16 | grain |
| 17 | return substrate |
| 18 | preparation substrate |
| 19 | sieve plane |
| 20 | sieve plane |
| 21 | fan |
| 22 | cleaning unit |
| 23 | grain auger |
| 24 | elevator |
| 25 | grain tank |
| 26 | roof edge of the cab |
| 27 | grain tank unloading tube |
| 28 | extension |
| 29 | surroundings detection device |
| 30 | functional element |
| 31 | driver's cab |
| 32 | display |
| 33 | control and regulating device |
| 34 | operator |
| 35 | bus system |

-continued

| List of Reference Symbols: | |
|---|---|
| 36 | work organ |
| 37 | close range |
| 38 | mid-range |
| 39 | long range |
| 40 | laser scanner |
| 41 | crop edge |
| 42 | surrounding detection signal |
| 43 | scanning planes |
| 44 | surroundings detected in sections |
| 45 | ground feature |
| 46 | scanning plane 4 |
| 47 | scanning plane 1 |
| 48 | scanning plane 2 |
| 49 | scanning plane 3 |
| 50 | results signals |
| 51 | object |
| 52 | direction of travel |
| 53 | three-sided sub-area |
| 54 | agriculturally usable area |
| 55 | boundary |
| 56 | bordering area |
| 57 | ground surface |
| 58 | surroundings |
| 59 | cab roof |
| 60 | laser beam of scanning plane 1 |
| 61 | laser beam of scanning plane 2 |
| 62 | laser beam of scanning plane 3 |
| 63 | laser beam of scanning plane 4 |
| 64 | harvest crop |
| 65 | obstacle |
| 66 | large obstacle |
| 67 | small obstacle |
| 68 | grain plants |
| 69 | stubble field |
| 70 | crop penetration depth |
| 71 | field end |
| 72 | scanner |
| 73 | laser beam |
| 74 | sensor system in functional element |
| 80 | hydraulic steering system |
| 81 | drive system |
| 82 | hydraulic brake system |
| 83 | cutting unit raising hydraulics |
| 84 | distance data |
| 85 | distribution density data |
| 86 | digital map |
| 89 | steering and/or control signal |
| 90 | crop height |
| α | ground scanning angle |
| β | scanner aperture angle |

The invention claimed is:

1. An agricultural work machine comprising
at least one working element positioned at a front of the agricultural work machine and including a width;
a surroundings detection device configured to detect objects in a plurality of sections by:
  scanning a close-range scanning plane for detecting objects in a first section that is in a forward direction of the agricultural work machine and includes at least a part of the width of the at least one working element;
  scanning at least one farther-range scanning plane for detecting the objects in at least second section, the at least second section being farther in the forward direction from the agricultural work machine than the first section and includes the at least a part of the width of the at least one working element;
a control and regulating device in communication with the surroundings detection device and one or more working elements, wherein the control and regulating device is configured to:

analyze a scan of the close-range scanning plane in order to detect whether at least one object is in the first section;

analyze a scan of the at least one farther-range scanning plane in order to detect whether the at least one object is in the at least second section, wherein the analysis of the scan of the close-range scanning plane is different from the analysis of the at least one farther-range scanning plane; and control the at least one working element based on the analysis of the scans from the close-range scanning plane and the at least one farther-range scanning plane.

2. The agricultural work machine of claim 1, wherein the surroundings detection device is a scanner configured, for the close-range scanning plane, to:

emit surroundings detection signals for scanning in the close-range scanning plane;

receive reflected surroundings detection signals back from detected objects in the first section; and generate a results signal based on the reflected surroundings detection signals.

3. The agricultural work machine of claim 1, wherein the first section includes a portion of an agriculturally usable area located in a direction of travel of the agricultural work machine and within a range of the surroundings detection device.

4. The agricultural work machine of claim 1, wherein a lateral extension of the first section extends at least in part over a width of the agricultural work machine.

5. The agricultural work machine of claim 1, wherein the surroundings detection device scans the plurality of sections detected in four scanning planes including the close-range scanning plane, a medium-range scanning plane, and a far-range scanning plane.

6. The agricultural work machine of claim 1, wherein the control and regulating device is further configured to calculate a distance and distribution density based on a time of reflection for reflected surroundings detection signals.

7. The agricultural work machine of claim 6, wherein the control and regulating device is further configured to:

calculates a ground contour and a crop density curve based on calculated distances and distribution densities; and generate a digital map that digitally maps an agriculturally usable area.

8. The agricultural work machine of claim 1, wherein the one or more working elements include a self-driving harvester, and a transport vehicle accompanying the agricultural work machine; and wherein the control and regulating device is configured to control both the self-driving harvester and the transport vehicle based on detecting the objects.

9. The agricultural work machine of claim 1, wherein control and regulating device is further configured to:

analyze surroundings detection signals;

operate a short-term precise control of the one or more working elements based on the analysis of the close-range scanning plane included in the surroundings detection signals; and operate a rough control of the one or more working elements based on the analysis of a medium-range scanning plane and a far-range scanning plane included in the surroundings detection signals.

10. The agricultural work machine of claim 1, wherein the control and regulating device is configured to control each working element by:

generating a results signal based on a detection of an obstacle in a respective section identified from a respective scanning plane included in the surroundings detection signal, wherein the results signal includes a command instruction for controlling the one or more working elements corresponding to the respective scanning plane; and controlling the one or more working elements according to the command instruction.

11. The agricultural work machine of claim 1, wherein the at least one farther-range scanning plane comprises a medium-range scanning plane and a far-range scanning plane;

wherein the surrounding detections device is configured to detect the objects in the plurality of sections by:

scanning a medium-range scanning plane for detecting the objects in the second section;

scanning a far-range scanning plane for detecting the objects in a third section, the third section being farther in the forward direction from the agricultural work machine than the second section and includes the at least a part of the width of the at least one working element;

wherein the control and regulating device is configured to:

analyze the scan of the medium-range scanning plane in order to detect whether the at least one object is in the second section; and analyze the scan of the far-range scanning plane in order to detect whether the at least one object is in the third section, wherein the analysis of the scan of the close-range scanning plane is different from at least one of the analysis of the scan of the medium-range scanning plane or the analysis of the scan of the far-range scanning plane; and wherein the control and regulating device is configured to:

control the at least one working element based on the analysis of the scans from the close-range scanning plane and at least one of the medium-range scanning plane or the far-range scanning plane.

12. The agricultural work machine of claim 11, wherein the control and regulating device is configured to analyze the scan of the close-range scanning plane for the at least one object beneath a crop height; and wherein the control and regulating device is configured to analyze the scan of the medium-range scanning plane or the scan of the far-range scanning plane for the at least one object above a crop height.

13. The agricultural work machine of claim 11, wherein the control and regulating device is configured to analyze the scan of the close-range scanning plane differently than the analysis of the scan of the medium-range scanning plane or the far-range scanning plane by detecting larger obstacles based on the scan of the medium-range scanning plane or the far-range scanning plane, than based on the scan of the close-range scanning plane.

14. The agricultural work machine of claim 11, wherein the control and regulating device is further configured to:

analyze the scans from the close-range scanning plane and at least one of the medium-range scanning plane or the far-range scanning plane to identify an end of field; and responsive to identifying the end of the field, generate one or more control signals in order to automatically raise a position of the at least one working element to a safety position and to steer the agricultural work machine out of one track and guide the agricultural work machine to a next track.

15. The agricultural work machine of claim 11, wherein the control and regulating device is configured to:
control the at least one working element based on the analysis of the scans from the close-range scanning plane and at least one of the medium-range scanning plane or the far-range scanning plane by:
controlling the agricultural work machine differently based on whether the at least one object is detecting in the close-range scanning plane versus detecting the at least one object in the at least one of the medium-range scanning plane or the far-range scanning plane.

16. The agricultural work machine of claim 15, wherein the control and regulating device is configured to control the agricultural work machine differently based on whether the at least one object is detecting in the close-range scanning plane versus detecting the at least one object in the at least one of the medium-range scanning plane or the far-range scanning plane by:
controlling the agricultural work machine by performing an emergency stop based on detecting the at least one object in the close-range scanning plane; and
controlling the agricultural work machine by performing an evasive maneuver based on detecting the at least one object in the at least one of the medium-range scanning plane or the far-range scanning plane.

17. The agricultural work machine of claim 16, wherein the control and regulating device is configured to perform the evasive maneuver by controlling both speed and steering of the agricultural work machine.

18. The agricultural work machine of claim 15, wherein the agricultural work machine includes crop harvesting attachment attached to the agricultural work machine; and
wherein the control and regulating device is configured to control the crop harvesting attachment differently based on whether the at least one object is detecting in the close-range scanning plane versus detecting the at least one object in the at least one of the medium-range scanning plane or the far-range scanning plane.

19. The agricultural work machine of claim 18, wherein the control and regulating device is configured to control the crop harvesting attachment by raising the crop harvesting attachment responsive to detecting the at least one object in the close-range scanning plane.

20. The agricultural work machine of claim 11, wherein the control and regulating device is further configured to:
analyze the scans from the close-range scanning plane and at least one of the medium-range scanning plane or the far-range scanning plane to determine a crop density curve;
generate, based on the crop density curve, a crop map indicative of an agriculturally usable area; and
wherein the crop map is used for targeted fertilization of crops within the agriculturally usable area.

* * * * *